United States Patent

House et al.

[11] 4,064,981
[45] Dec. 27, 1977

[54] LIMIT STOP

[75] Inventors: William H. House; Gerald A. Pierik, both of Palos Verdes Peninsula, Calif.

[73] Assignee: The Garrett Corporation, Los Angeles, Calif.

[21] Appl. No.: 552,840

[22] Filed: Feb. 24, 1975

[51] Int. Cl.² ............................................. F16D 71/00
[52] U.S. Cl. ............................... 192/141; 74/424.8 R; 74/89.15
[58] Field of Search .............. 74/89.15, 424.8, 424.8 B; 192/141

[56] References Cited

U.S. PATENT DOCUMENTS

| 459,769 | 9/1891 | Russell | 74/424.8 B |
| 2,092,563 | 9/1937 | Tucker | 74/424.8 B |
| 2,959,064 | 11/1960 | Geyer et al. | 74/89.15 |
| 3,151,842 | 10/1964 | Ishai et al. | 74/89.15 |
| 3,402,613 | 9/1968 | Neusel et al. | 74/89.15 |
| 3,543,598 | 12/1970 | Lanzenberger | 74/424.8 B |
| 3,623,574 | 11/1971 | Gardner | 74/89.15 |
| 3,668,940 | 6/1972 | Avena et al. | 74/89.15 |

Primary Examiner—Samuel Scott
Assistant Examiner—Wesley S. Ratliff, Jr.
Attorney, Agent, or Firm—Joel D. Talcott; Albert J. Miller

[57] ABSTRACT

Limit stop apparatus wherein a driven shaft rotates a predetermined number of revolutions in either direction whereupon a travelling nut assembly contacts a shock absorbing stop to terminate shaft rotation by frictionally jamming screw threads between the nut assembly and the driven shaft. Outer and inner portions of the nut assembly are connected for limited relative rotational motion on non-jamming auxiliary threads, thus permitting the driven shaft to be backed off to release the nut assembly from the shock absorbing stop and thereby release the jammed threads with a minimum of available torque. By this structure, locking of the limit stop at either end is prevented.

7 Claims, 2 Drawing Figures

LIMIT STOP

This invention relates to limit stop apparatus and more particularly to a non-jamming travelling nut type of limit stop for a driven shaft.

The use of a travelling nut on a threaded shaft to limit the number of revolutions which the shaft may make in either direction is well known. By preventing rotation of the nut, rotation of the shaft causes the nut to travel axially along the shaft until it engages an electrical switch or mechanical stop at the end of its travel. By such structure, the amount of rotational motion of the shaft can be determined by controlling the linear motion of the nut.

In some applications, such as flap actuators for airplanes, this type of limit stop is used as a backup for other types of switching arrangements to ensure that a malfunction does not permit the flaps to be driven so far that they are locked in position or damage the structure. To accomplish this, the travelling nut is caused to interact with brake assemblies positioned at the outer limits of its travel. Interaction of the nut with the brake assembly works against the driving action of the threaded shaft until the torque necessary to move the nut further is greater than the available torque, whereupon motion is stopped. An example of this type of limit stop is shown in U.S. Pat. No. 2,620,911 issued to Alfred Krell on Dec. 9, 1952.

If operation of such a limit stop is examined, by way of example, with respect to a flap actuator device, it can be seen that the travelling nut is driven into the mechanical brake assembly not only by energy provided by the actuator motor but additionally by kinetic energy provided by the travelling flap. This combined energy drives the travelling nut assembly firmly against the brake assembly. However, when the motor is reversed, the only energy available to release the nut from its interaction with the brake assembly is that supplied by the motor, the flap and motor rotor being motionless and thus possessing no kinetic energy. Accordingly, it is possible for the travelling nut to become jammed against the brake assembly so that, as a result, the flap becomes locked in position.

It is well known by those skilled in the art that such a travelling nut device or jackscrew can be constructed such that it is relatively easy to release the travelling nut from the brake assembly. This is accomplished by choosing a large helix angle for the thread so that the effect of frictional interaction is minimized. As is well known to those skilled in the art, the helix angle of such a thread should be greater than or equal to the arctangent of the coefficient of friction. However, this requires the use of a relatively long thread and, accordingly, a long shaft so that in applications requiring a large number of revolutions to control the travel of a flap or other device, the limit stop assembly would be extremely large. Such large structures are often not permissible due to space, weight or financial restrictions.

Thus it is necessary to construct limit stops with fine, small angle threads so that substantial numbers of revolutions can be provided in a small amount of space. With such a structure, relatively familiar in the prior art, an excessive impact load produced by the combination of kinetic energy of the rotating members, and the driven device in addition to the driving force of the actuator motor could jam the limit stop, preventing the driven shaft from being released by available torque for rotation in the opposite direction.

In accordance with this invention, a limit stop assembly is provided having fine, small angle threads to permit the limit stop to operate with devices requiring a large number of revolutions and yet comply with limited space and weight requirements. Further, means are provided for the avoidance of jamming when the device is reversed after engaging a mechanical stop assembly.

Jamming is prevented by utilizing a two-part travelling nut structure so that the limit stop comprises a pair of concentric jackscrews. The inner jackscrew consists of an inner portion of the travelling nut and the driven shaft, having fine threads to permit a large number of revolutions. The outer jackscrew consists of outer and inner portions of the travelling nut, having a coarse, non-jamming thread so that its operation upon reversal of motion of the shaft will relieve the forces jamming the inner jackscrew. Travel of the outer jackscrew is limited to prevent interference with operation of the limit stop apparatus during normal operation.

Figures 1, 2:
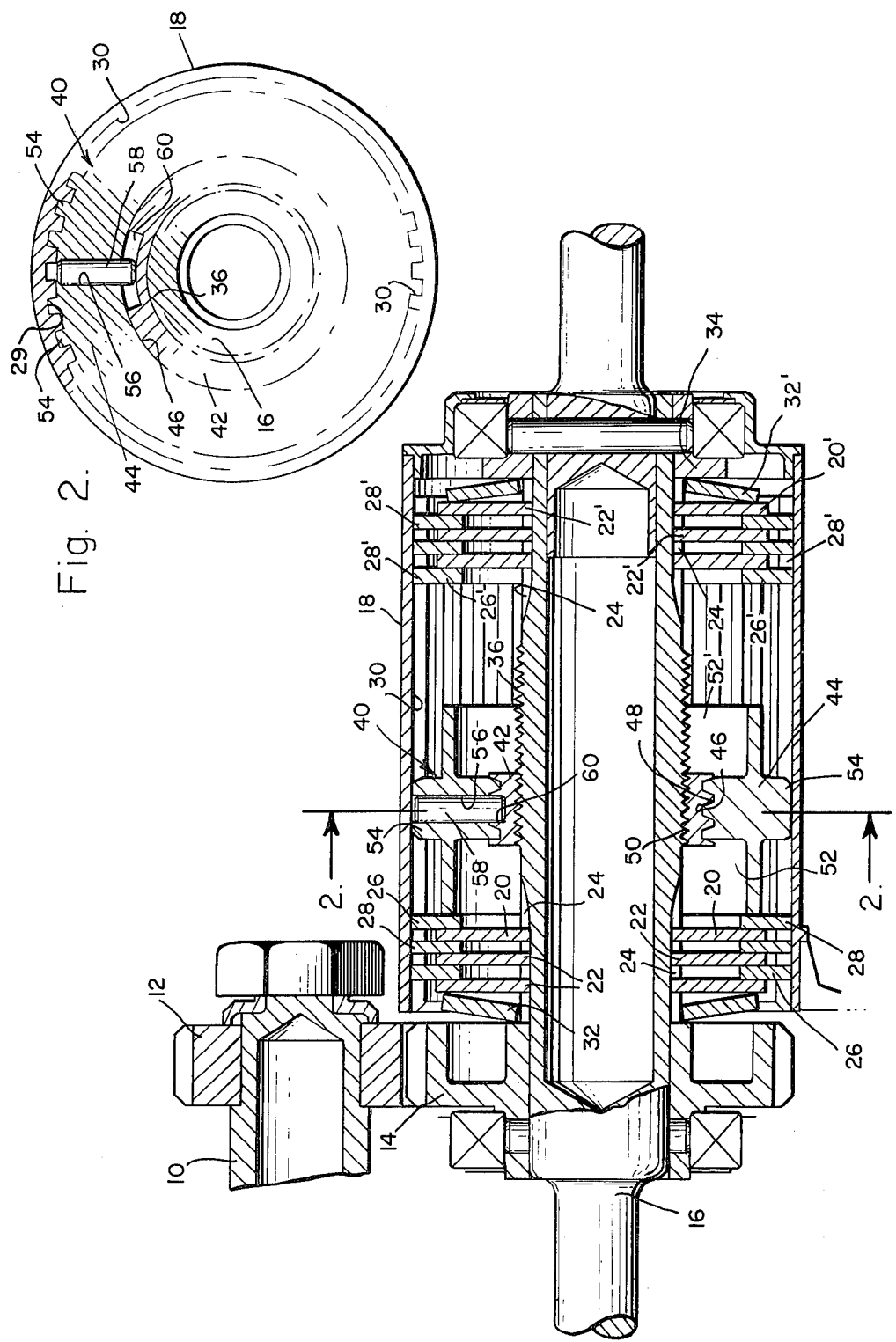
FIG. 1 is a cross-sectional view of a limit stop of this invention.
FIG. 2 is a cross-sectional view taken generally along the lines 2—2 of FIG. 1.

Referring now to the drawings, a driven input shaft 10 is illustrated which is adapted to be rotated by an actuator, such as a motor (not shown). A pinion gear 12 on shaft 10 meshes with a gear 14 secured to an output shaft 16 mounted for rotation within a housing 18.

The output shaft 16 carries a plurality of flat, annular brake discs 20 and spaced projections 22 on an inner surface fitting into longitudinal slots 24 provided in the surface of the shaft 16 so that the discs 20 rotate with the shaft 16 and are free to slide axially therealong. Interleaved between the discs 20 are nonrotating annular discs 26. The discs 26 are provided with splined teeth 28 which slidably fit in slots 29 between splines 30 formed in the inner surface of the housing 18. On the opposite end of output shaft 16 similar rotating discs 20' with projections 22' thereon and stationary discs 26' having splined teeth 28' are similarly carried by the shaft 16 and housing 18, respectively. Preferably the rotating discs 20 and 20' are formed of steel while the stationary discs 26 and 26' are of bronze or another frictionally compatible material.

A Belleville washer 32 is positioned on the shaft 16, intermediate gear 14 and the endmost rotating disc 20. A similar Belleville washer 32' is positioned on the shaft 16 intermediate the last disc 20' and a larger diameter portion 34 of the shaft 16. The outer surface of the output shaft 16 is provided with a thread 36 having a pitch which is appropriate to provide for the necessary number of turns required for the output shaft 16 within the space limitations of the housing 18. If a large number of turns are required and a small space is provided, the threads will generally be of low lead and low efficiency and will be, accordingly, jamming in character.

A travelling nut assembly 40 comprises an inner nut portion 42 and an output nut portion 44. An outer surface of the inner nut portion 42 is provided with a non-jamming thread 46, the tangent of the helix angle preferably being greater than the coefficient of friction, and an inner surface of the outer nut portion 44 is provided with a mating high lead and high efficiency non-jamming thread 48. These threaded surfaces are dimensioned to permit the inner and outer portions 42 and 44 to be threaded together. A thread 50 on the inner surface of the inner nut 42 matches the thread 36 on the output shaft 16 to permit threading of the travelling nut assembly 40 on to the output shaft.

A pair of cylindrical protrusions 52 and 52' are provided on opposite sides of the outer nut portion 44 and the outer surface of the outer nut portion 44 has a plurality of splined teeth 54 thereon which slidably fit in the slots 29 of the housing 18 to prevent rotation of the outer nut portion 44.

A generally radially disposed passage 56 in the outer nut portion 44 holds a pin 58 which extends into a circumferential groove 60 in the inner nut portion 42. As will be readily apparent, the pin 58 limits relative motion between the inner and outer nut portions to a circumferential distance equal to the travel of the pin between the ends of the circumferential groove 60.

In operation, rotation of the input shaft 10, by interaction of the pinion gear 12 and with the gear 14, rotates the shaft 16, the direction of rotation depending on the direction in which the input shaft is driven by the actuator (not shown). Because the travelling nut assembly 40 is prevented from rotating by the interaction of the spline teeth 54 with the splines 30, the travelling nut assembly moves axially along the output shaft 16, the direction of motion being dependent upon the direction of rotation of the shaft 16. When motion of the shaft 16 begins, the inner nut portion 42 is shifted with respect to the outer nut portion 44 so that the pin 58 moves to one end portion of the groove 60.

It can be seen in FIG. 1, as the travelling nut assembly 40 approaches the limit of its travel, the cylindrical protrusion 52 on one side of the outer nut portion 44 engages the innermost disc 26 so that the discs 26 are compressed against the disc 20 and the Belleville washer 32, absorbing the energy of the output shaft 16 and wedging the thread 36 of the output shaft firmly against the thread 50 on the travelling nut assembly. Ultimately, the frictional engagement between the shaft 16 and travelling nut assembly 40 becomes sufficient to stop motion of the output shaft 16 in a manner well known to those skilled in the art.

Having firmly jammed the threads 36 against the threads 50, it now becomes desirable to reverse the direction of rotation of the output shaft 16. However, the amount of torque available to accomplish this is almost always less than the torque which jammed the threads together and may thus be insufficient to perform the task. However, the limit stop of this invention permits reversal of direction with relative ease. As the output shaft 16 rotates, the inner nut portion 42 which is tightly frictionally engaged with the shaft, tends to rotate therewith. The outer nut portion 44, however, is engaged by the spline 30 in the housing 18 so that rotation is prevented. The inner nut portion 42 thus rotates on the non-jamming threads 46 and 48 with respect to the outer nut portion 44. As will be readily understood by those skilled in the art, the character of the thread between the inner and outer nut portions renders such rotation rather simple. The pin 58 in the groove 60 limits the amount of relative motion but permits sufficient rotation to unjam the mating threads 36 and 50 so that when the pin 58 has moved across the groove 60 and engaged the other end, the travelling nut assembly 40 freely moves along the output shaft 16. To prevent the jammed brake discs 20 from interfering with rotation of the shaft 16, the projections 22 are constructed to loosely fit in the slots 24 and thereby provide sufficient "backlash" to enable the shaft to rotate until the brake discs have become unjammed.

It can be seen that each change in direction of rotation of the shaft 16 shifts the pin 58 to the opposite end of the groove 60 so that the relative positions of the inner and outer nut portions of the travelling nut assembly 40 permit release of the assembly at the next engaged end of travel.

In this manner, a limit stop is provided which enables jammed threads to be readily released at both extreme end portions of its travel.

We claim:

1. Limit stop apparatus for a rotating shaft, said apparatus comprising first jackscrew means including a rotating shaft and a first travelling member, second jackscrew means including said first travelling member, a second travelling member, means for preventing rotation of said second travelling member, stop means for energizing said second travelling member, and means for permitting limited relative motion between said first and second travelling members for stopping rotation of said shaft in one direction and releasing said shaft upon rotation in another direction.

2. Limit stop apparatus as in claim 1 wherein said motion limiting means comprises a circumferential opening in one of said first and second travelling members, and pin means affixed to the other of said travelling members and extending into said circumferential opening.

3. Limit stop apparatus for rotatable drive shaft comprising an output shaft mounted in a support and connected for rotation with the drive shaft, said output shaft having external threads, a nut having internal threads in engagement with said output shaft external threads, said nut being provided with external threads, a nut member having internal threads in engagement with said nut external threads, spline means on said support on said nut member for preventing rotation of said nut and nut member and providing axial movement thereof along said output shaft when said output shaft is rotated, and brake means connected to said output shaft at each end to support for braking rotation of said output shaft and the drive shaft upon engagement of said nut member and said brake means.

4. The limit stop apparatus of claim 3 wherein said output shaft external threads and said nut internal threads are of low efficiency and jamming, and said nut member internal threads and said nut external threads are of high efficiency and non-jamming.

5. The limit stop apparatus of claim 4 including means for limiting travel of said high efficiency threads.

6. A method of limiting motion of a rotating shaft having a main screw thread, a first travelling member mounted on the main screw thread and a non-rotatable second travelling member mounted on a non-jamming screw thread on the first travelling member, said method comprising the steps of rotating the shaft in one direction, stopping the travel of the second travelling member to jam the main screw thread and stop shaft rotation, rotating the shaft in the opposite direction causing relative motion of said first and second travelling members on the non-jamming thread for unjamming the main screw thread, and terminating relative motion of the first and second travelling members after the main screw thread is unjammed.

7. Limit stop apparatus comprising:
a rotatable shaft;

an inner travelling nut member threaded on said shaft on matched jamming threads;

an outlet travelling nut member threaded on said inner travelling nut member on matched non-jamming threads;

means for preventing rotation of said outer travelling nut member;

a circumferential opening in one of said inner and outer travelling nut members;

pin means affixed to the other of said travelling nut members and extending into said circumferential opening; and stop means for engaging said outer travelling nut member.

* * * * *